US007835223B2

(12) United States Patent
Goujon

(10) Patent No.: US 7,835,223 B2
(45) Date of Patent: Nov. 16, 2010

(54) REMOVING NOISE FROM SEISMIC DATA OBTAINED FROM TOWED SEISMIC SENSORS

(75) Inventor: Nicolas Goujon, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 819 days.

(21) Appl. No.: 11/740,763

(22) Filed: Apr. 26, 2007

(65) Prior Publication Data

US 2008/0151688 A1    Jun. 26, 2008

Related U.S. Application Data

(63) Continuation-in-part of application No. 11/643,174, filed on Dec. 21, 2006, now abandoned.

(51) Int. Cl.
*G01V 1/20* (2006.01)
*G01V 1/36* (2006.01)
*G01V 1/38* (2006.01)

(52) U.S. Cl. ............................. 367/21; 367/16; 367/20; 702/17

(58) Field of Classification Search .................. 702/17; 367/16, 20, 21
See application file for complete search history.

(56) References Cited

U.S. PATENT DOCUMENTS

| 3,274,541 | A | * | 9/1966 | Embree | 367/62 |
| 4,737,937 | A | * | 4/1988 | Keckler et al. | 367/20 |
| 4,809,235 | A | * | 2/1989 | Dragoset, Jr. | 367/21 |
| 4,887,244 | A | * | 12/1989 | Willis et al. | 367/73 |
| 4,992,992 | A | * | 2/1991 | Dragoset, Jr. | 367/21 |
| 6,049,507 | A | * | 4/2000 | Allen | 367/21 |
| 6,446,008 | B1 | * | 9/2002 | Ozbek | 702/17 |
| 6,446,009 | B1 | * | 9/2002 | Baeten et al. | 702/17 |
| 2006/0239117 | A1 | | 10/2006 | Singh | |

OTHER PUBLICATIONS

International Search Report, dated Sep. 15, 2008, for Application No. PCT/US2007/086762.

* cited by examiner

*Primary Examiner*—Mark Hellner
*Assistant Examiner*—Ari M Diacou

(57) ABSTRACT

A technique includes obtaining different sets of data, which are provided by seismic sensors that share a tow line in common. Each data set is associated with a different spatial sampling interval. The technique includes processing the different sets of data to generate a signal that is indicative of a seismic event that is detected by the set of towed seismic sensors. The processing includes using the different spatial sampling intervals to at least partially eliminate noise from the signal.

21 Claims, 7 Drawing Sheets

REMOVING NOISE FROM SEISMIC DATA OBTAINED FROM TOWED SEISMIC SENSORS

CROSS-REFERENCE TO RELATED APPLICATIONS

This continuation-in-part application claims benefit of U.S. non-provisional patent application, Ser. No. 11/643,174, filed Dec. 21, 2006, now abandoned, by the same inventors, with the same title, which is incorporated herein by reference.

BACKGROUND

The invention generally relates to removing noise from seismic data that is obtained from towed seismic sensors.

Seismic exploration involves surveying subterranean geological formations for hydrocarbon deposits. A survey typically involves deploying seismic source(s) and seismic sensors at predetermined locations. The sources generate seismic waves which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

The data that is recorded from the towed streamers may be contaminated with vibration noise. The vibration noise typically has a relatively slow apparent velocity along the streamer, and spatial aliasing of the vibration noise inside the signal cone may be reduced or avoided by increasing the density (and number) of the sensors along the streamer. However, it may be impractical and/or relatively costly to reduce the vibration noise to the desired level by merely increasing the number of sensors.

SUMMARY

In an embodiment of the invention, a technique includes obtaining different sets of data, which are provided by towed seismic sensors that share a tow line in common. Each data set is associated with a different spatial sampling interval. The technique includes processing the different sets of data to generate a signal that is indicative of a seismic event that is detected by the set of towed seismic sensors. The processing includes using the different spatial sampling intervals to at least partially eliminate noise from the signal.

In another embodiment of the invention, a system includes an interface and a processor. The interface receives different sets of data, which are provided by seismic sensors that share a tow line in common while in tow, and each data set is associated with different spatial sampling intervals. The processor generates a signal that is indicative of a seismic event that is detected by the set of seismic sensors, and the processor uses the different spatial sampling intervals to at least partially eliminate noise from the signal.

In another embodiment of the invention, an article includes a computer accessible storage medium to store instructions that when executed by a processor-based system cause the processor-based system to obtain different sets of data, which are provided by seismic sensors that share a tow line in common. Each data set is associated with a different spatial sampling interval. The instructions when executed by the processor-based system cause the system to process the different sets of data to generate a signal that is indicative of a seismic event that is detected by the set of towed seismic sensors and use the different spatial sampling intervals to at least partially eliminate noise from the signal.

In yet another embodiment of the invention, a system includes a streamer and first and second sets of seismic sensors, both of which are located on the streamer. Adjacent sensors of the first set are separated by a first distance, and adjacent sensors of the second set are separated by a second distance. Neither the first distance nor the second distance is a multiple of the other of the first and second distances.

Advantages and other features of the invention will become apparent from the following drawing, description and claims.

DETAILED DESCRIPTION

Figure 1:
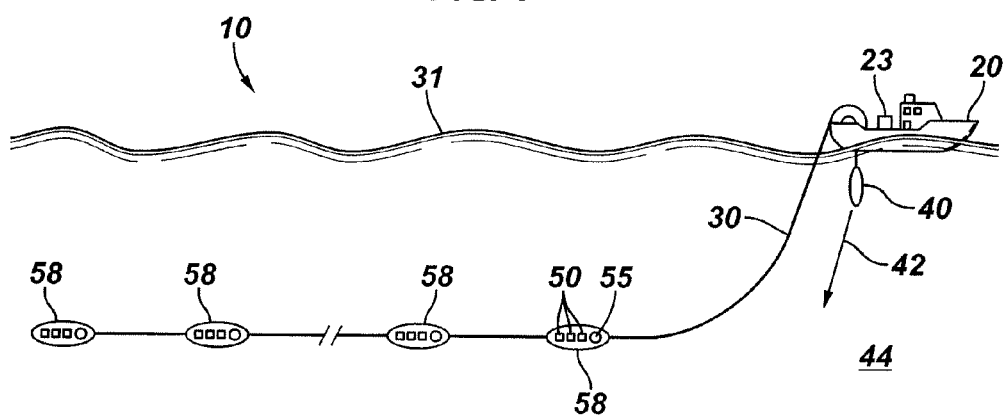
FIG. 1 is a schematic diagram of a marine seismic acquisition system according to an embodiment of the invention.
Figure 1:
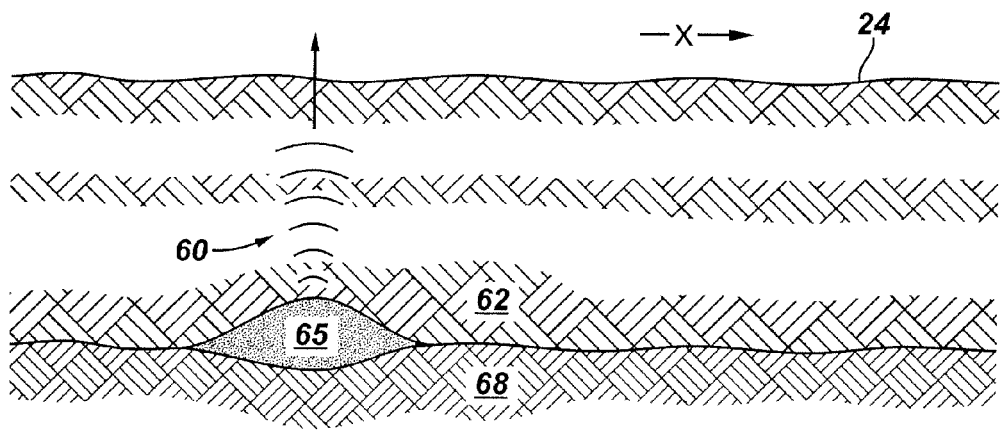

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and depth (z) components, for example) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are generated by the sources 40 produce corresponding reflected acoustic signals, or pressure waves 60, which are sensed by the multi-component seismic sensors 58. It is noted that the pressure waves that are received and sensed by the seismic sensors 58 may be primary pressure waves that propagate to the sensors 58 without reflection, as well as secondary pressure waves that are produced by reflections of the pressure waves 60, such as pressure waves that are reflected from an air-water boundary 31.

In accordance with some embodiments of the invention, the seismic sensors 58 generate signals (digital signals, for example), called "traces," which indicate the detected pressure waves. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55 and may provide one or more traces, which correspond to one or more components of particle motion, which are measured by its accelerometers 50.

Figure 11:
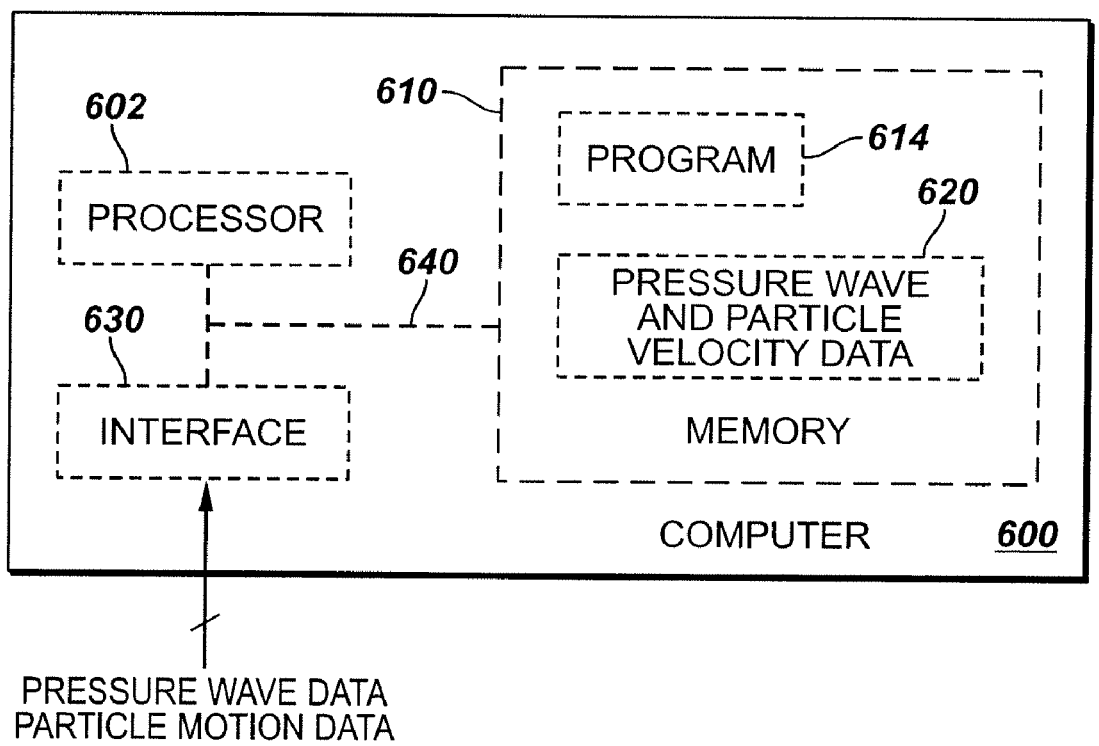
FIG. 11 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in the subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 600 that is depicted in FIG. 11 and further described below) that may be, for example, located on land or on the vessel 20. Thus, many variations are possible and are within the scope of the appended claims.

Figure 2:
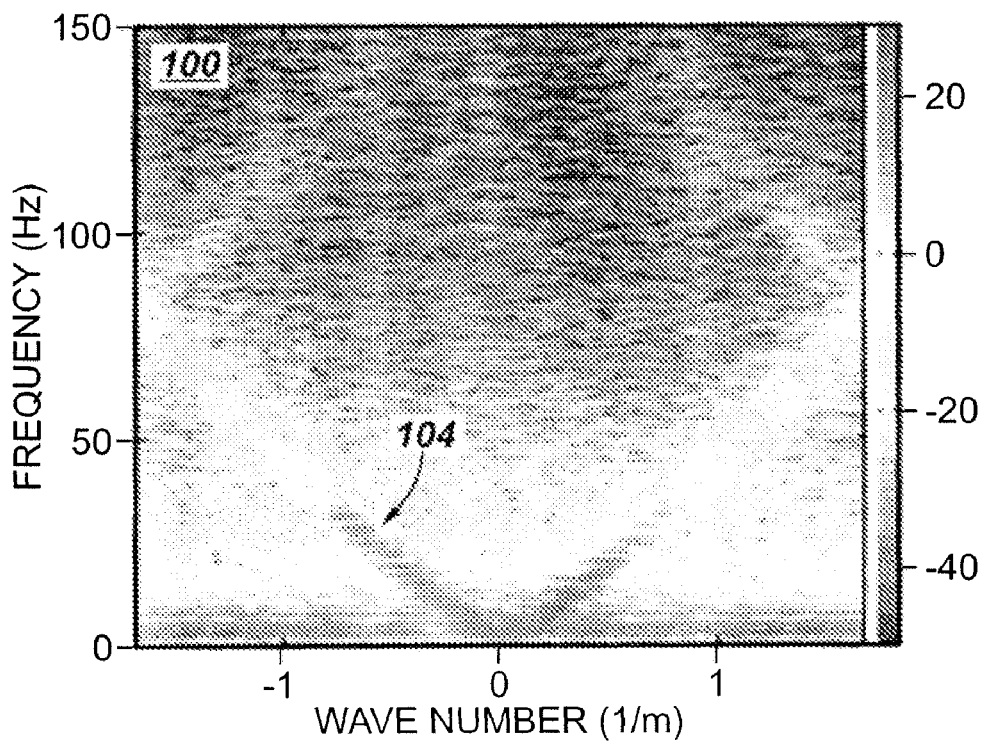
FIG. 2 is a plot in frequency-wave number (f-k) space of exemplary vibration noise that is present in a signal that is recorded from a towed streamer.
Figure 3:
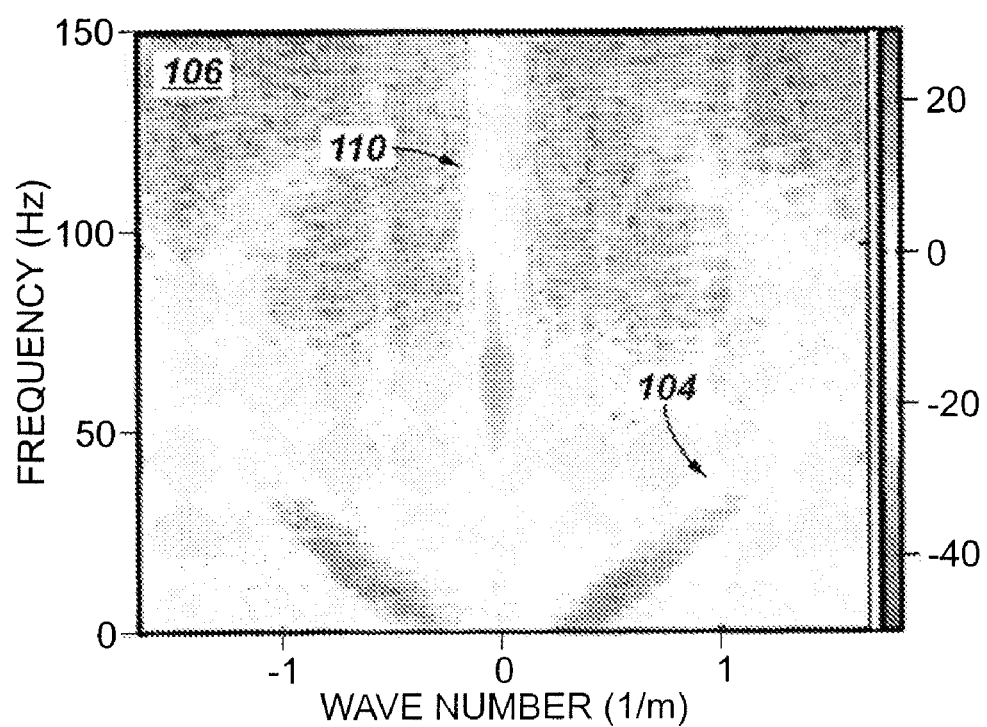
FIG. 3 is a plot in f-k space of an exemplary signal that is recorded from a towed streamer.

The seismic streamers 30 may contain, in accordance with some embodiments of the invention, geophones, which record vibration in the streamer in addition to the seismic signal. As a result, the seismic streamers 30 may introduce vibration noise into the seismic data. For example, FIG. 2 is a plot 100 in frequency-wave number (f-k) space of exemplary vibration noise 104, which may be present in a signal that is recorded from a streamer 30. FIG. 3 generally depicts an f-k space plot 106 of a recorded signal that contains content 110 that represents the detected seismic event, as well as the vibration noise 104. For a sufficiently small spatial sampling interval (i.e., the uniform distance between the sensors of the streamer 30, which provide the data set) the noise 104 is fully outside the signal cone for the frequency band of interest, is distinguishable from the content 104, which is concentrated around wave number 0 (acoustic propagation), and can therefore be filtered without affecting the seismic signal content 104. However, achieving a spatial sampling interval that results in sufficient elimination of the vibration noise 104 from the signal cone may require a large number of closely-spaced sensors, an arrangement that may be quite costly and technically challenging.

Instead of reducing vibration noise in the recorded signal by relying solely on a small spatial sampling interval, an approach in accordance with embodiments of the invention described herein uses multiple spatial sampling intervals to achieve the same result. More specifically, in accordance with some embodiments of the invention, the streamer has sensors that are organized to have two different spacing intervals. In other words, the streamer includes a first set of sensors, which are spaced apart pursuant to a first spacing distance and a second set of sensors, which are spaced apart by a second spacing distance that is different than the first distance. Although each of the recorded signals may contain vibration noise that invades the signal cone, noise contamination occurs at different frequencies for the two data sets. Therefore, the two data sets may be frequency filtered to remove the corresponding signal content that falls within the contaminated frequency bands. Because the filtered out frequency bands do not overlap, the two frequency filtered data sets may be combined to generate a single full bandwidth data set, which represents a recorded seismic signal that contains very little, if any, vibration noise in the signal cone.

Figure 4:
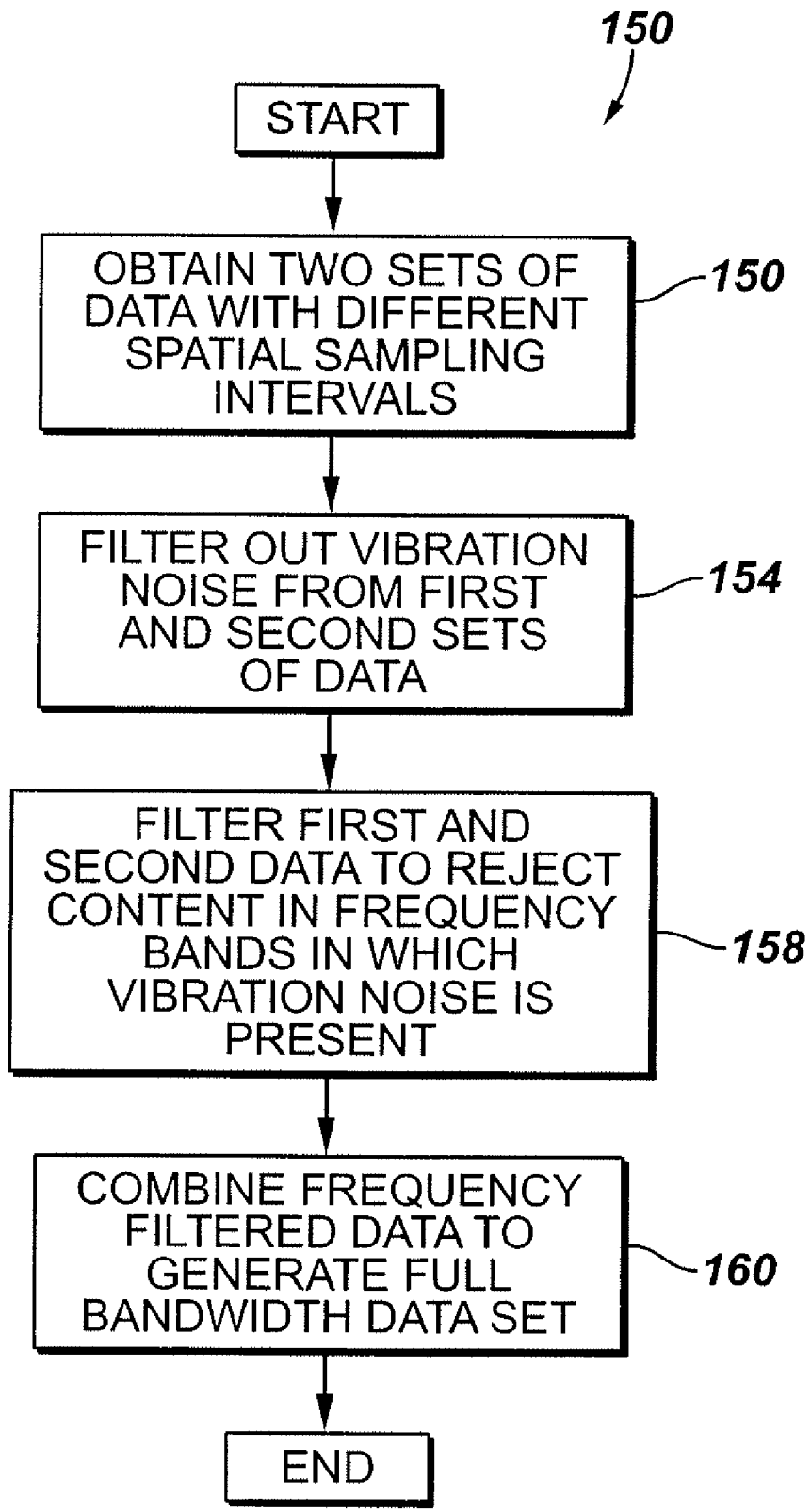
FIG. 4 is a flow diagram depicting a technique to remove vibration noise from a signal that is recorded from a towed streamer according to an embodiment of the invention.

As a more specific example, in accordance with some embodiments of the invention, a technique 150 that is depicted in FIG. 4 may be used to remove vibration noise. Pursuant to the technique 150, two sets of data, which are recorded from the same streamer are obtained; and each set of data is associated with a different spatial sampling interval, as depicted in block 152. It is noted that each spatial sampling interval may be too large for purposes of sufficiently eliminating vibration noise from the corresponding data set. Thus, the signal that corresponds to each data set may have vibration noise that is aliased into the signal cone. Additionally, it is noted that in accordance with embodiments of the invention, the spatial sampling intervals are not multiples of each other for purposes of ensuring that the vibration noise is not aliased into the same frequency band(s).

Pursuant to the technique 150, wavenumber filtering may first be applied to the data sets to filter out (block 154) vibration noise. It is noted that wavenumber filtering is one type of filtering. As a more specific example, the filtering applied in block 154 may be the same type of filtering discussed in U.S. Pat. No. 6,446,008, entitled "ADAPTIVE SEISMIC NOISE AND INTERFERENCE ATTENUATION METHOD," which issued on Sep. 3, 2002. Next, pursuant to the technique 150, the data sets are filtered (block 158) to reject the corresponding content in the frequency bands in which vibration noise is present. The two sets of frequency filtered data are then combined (block 160) to generate a full bandwidth data set, which represents a signal that is significantly free of vibration noise in the signal cone. For example, in accordance with other embodiments of the invention, the combination may be more complex than just truncation in a frequency band. The combination may involve a weighted sum, which is dependent on noise levels, for example.

The technique 150 is merely provided as an example of a possible embodiment of the invention. It is noted, however, that many variations may be made to the technique that fall within the scope of the appended claims. For example, in accordance with other embodiments of the invention, block 158 may be performed before block 154.

Vibration noise and its propagation velocity may not be constant along the streamer 30 because of differences in tension, and the vibration noise may change with time in one position, such as a change due to a corresponding change in towing speed, for example. The spatial aliasing frequency for vibration noise will therefore be variable. However, such variation does not impact the technique 150, as a change in vibration velocity merely stretches the f-k plot along the frequency axis. The stretching is similar for both data sets; and therefore, the aliasing still occurs at different frequencies for the two data sets.

Figure 5:
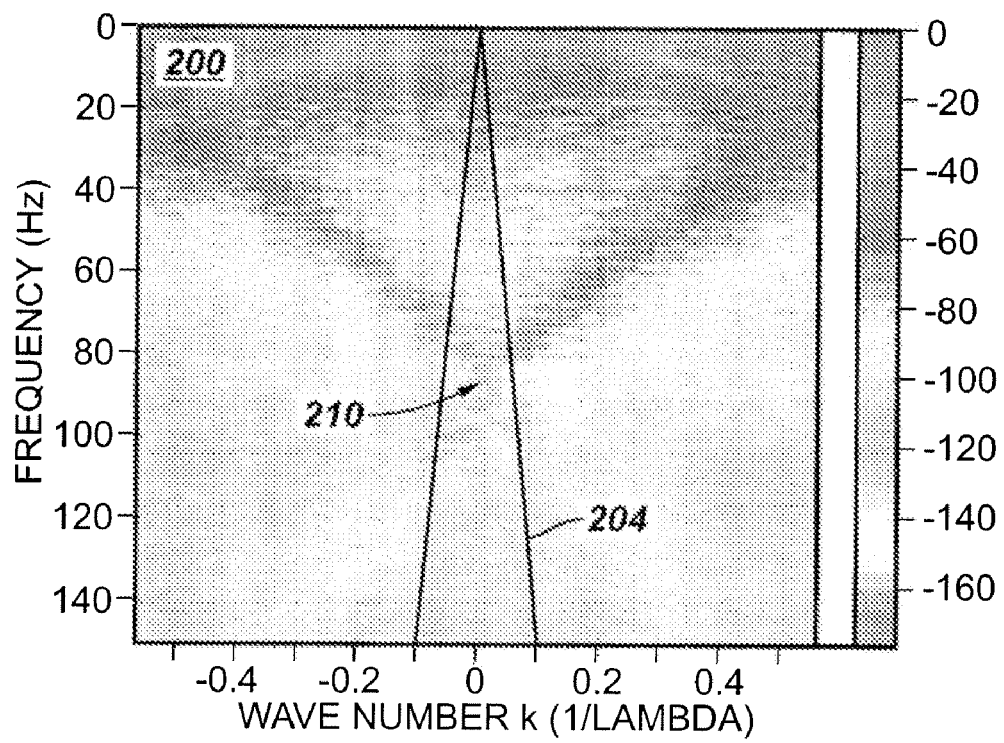
FIGS. 5 and 6 are plots in f-k space of exemplary signals recorded using different spatial sampling intervals according to an embodiment of the invention.
Figure 6:
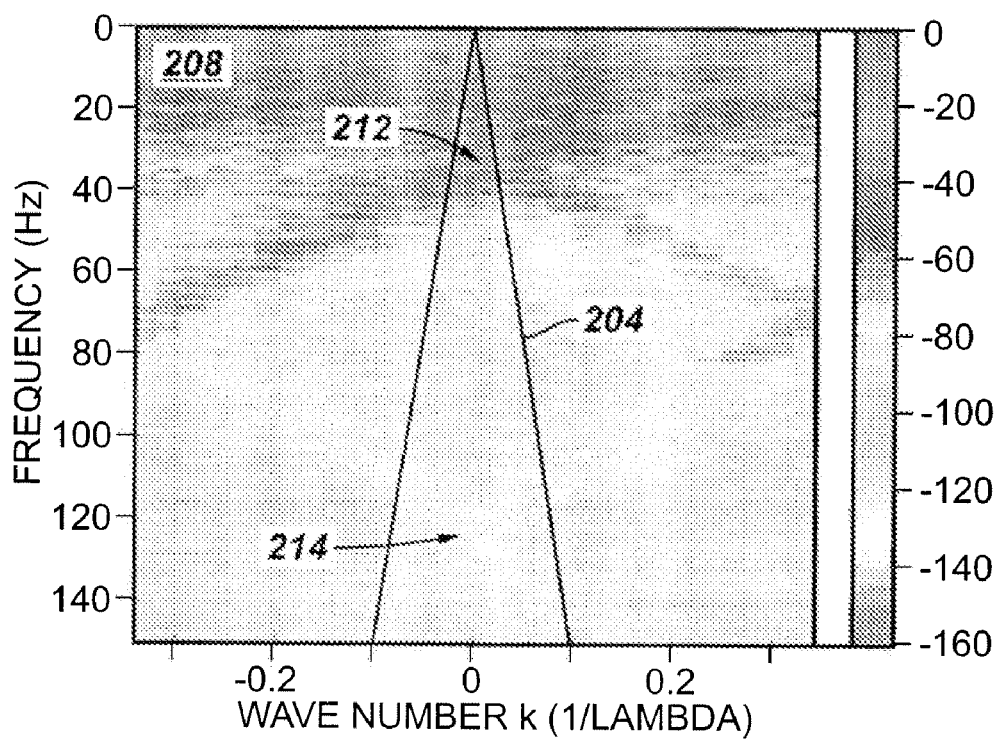
Figure 7:
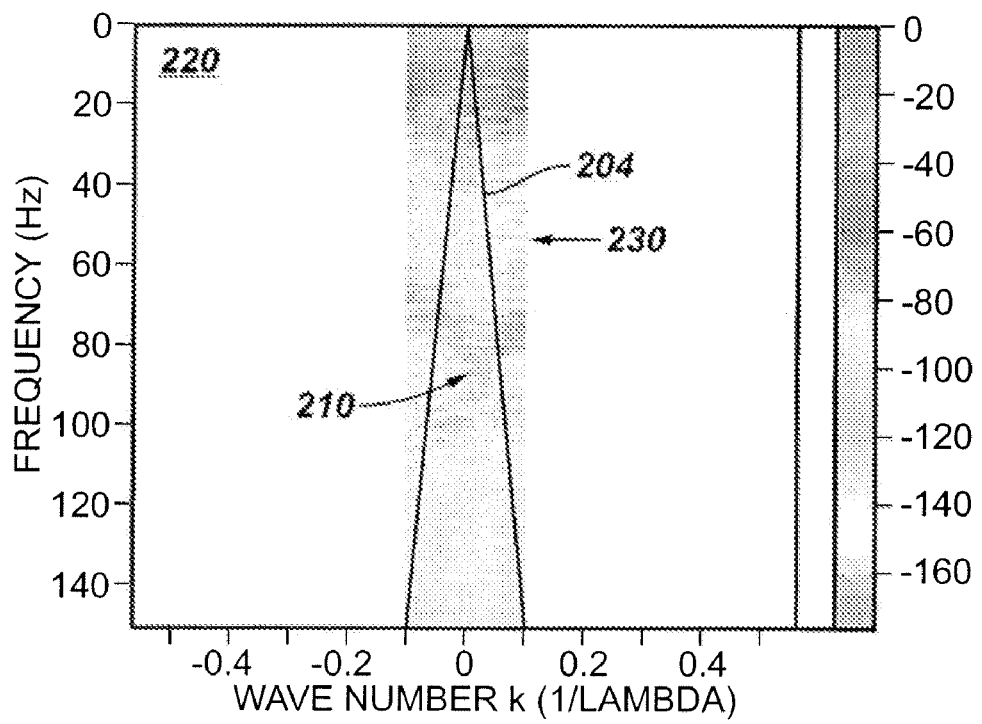
FIGS. 7 and 8 are plots in f-k space of the signals in FIGS. 5 and 6, respectively, after filtering to remove velocity noise according to an embodiment of the invention.
Figure 8:
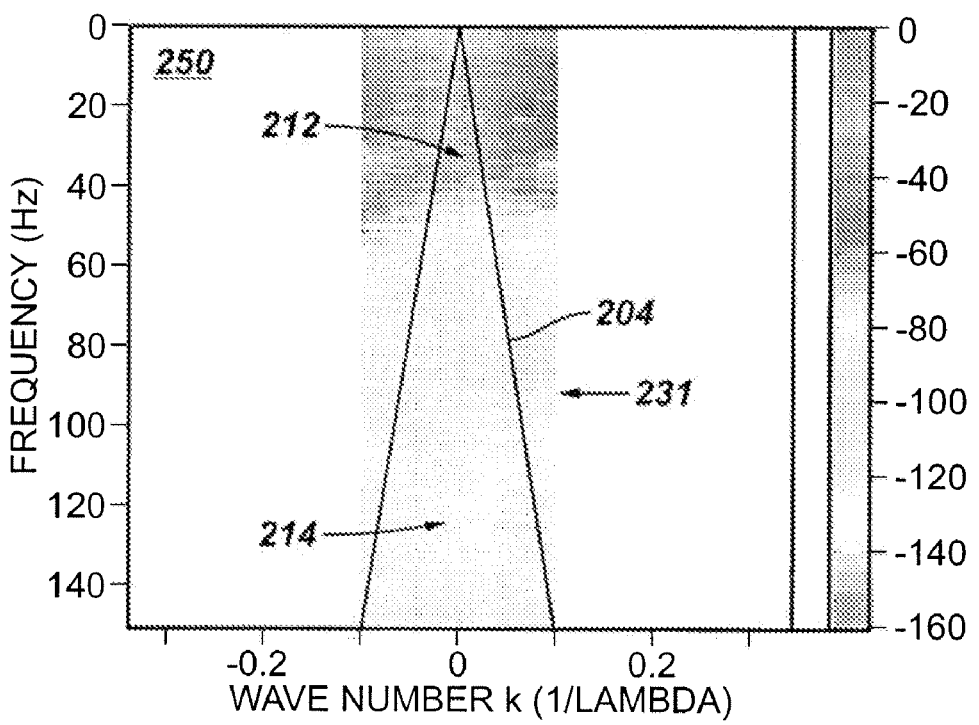
Figure 9:
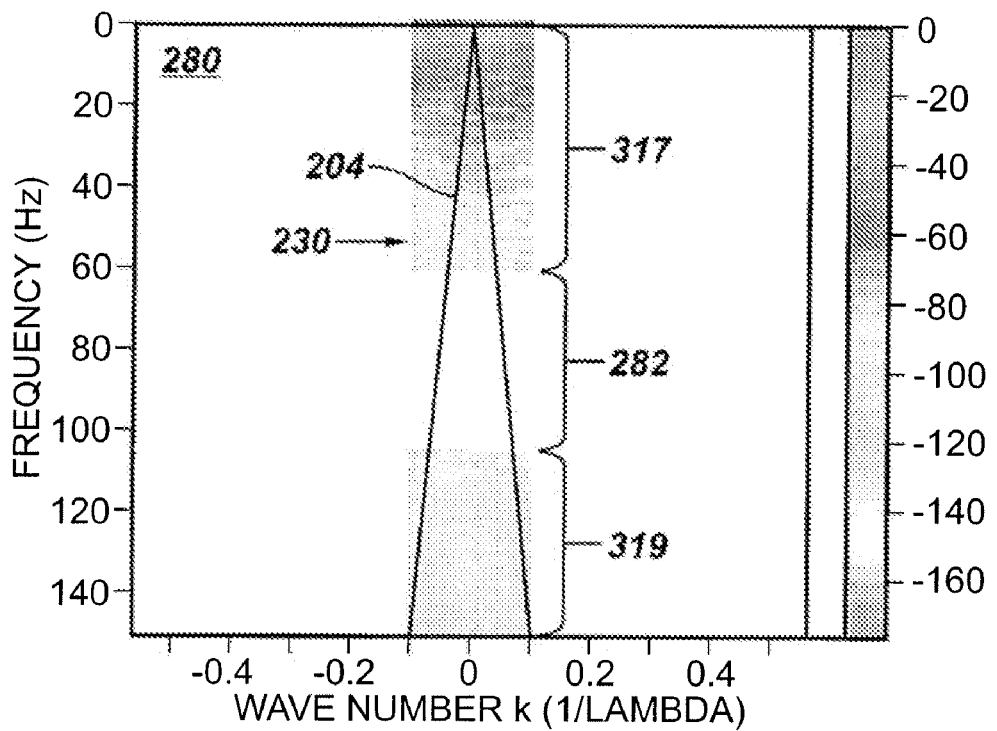
FIGS. 9 and 10 are plots in f-k space of the signals in FIGS. 7 and 8, respectively, after frequency band filtering according to an embodiment of the invention.
Figure 10:
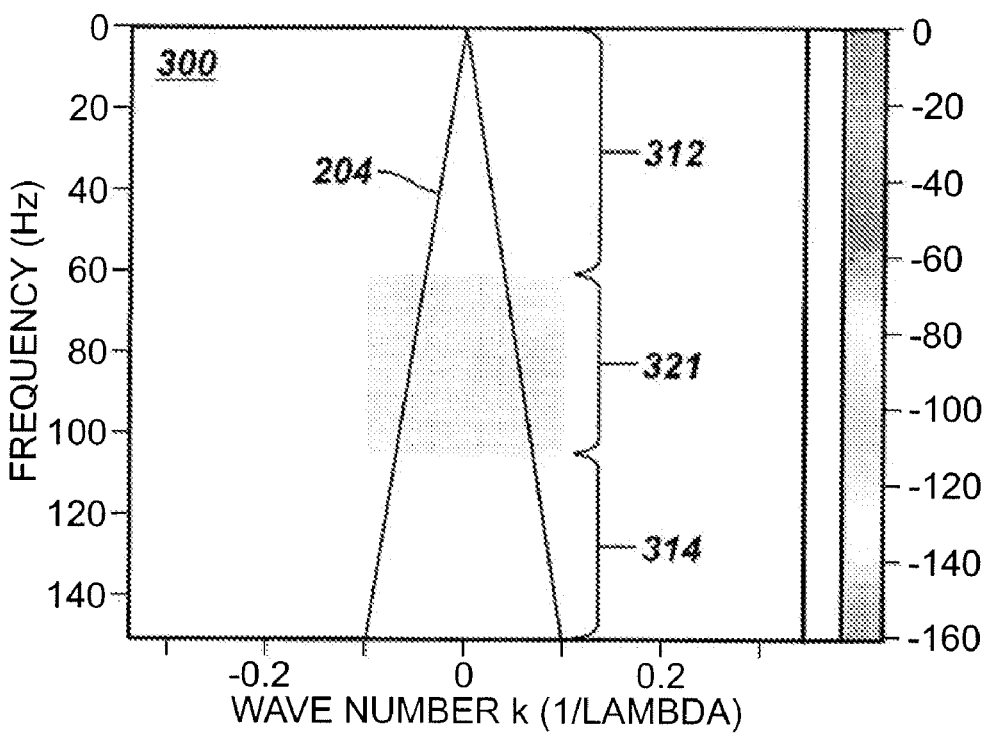

As a more specific example, FIGS. 5-10 depict application of the technique 150 to data sets that are associated with 90 centimeter (cm) and 150 cm spatial sampling intervals along the same towed streamer. FIGS. 5, 7 and 9 depict processing of the 90 cm interval data set (before combination with the 150 cm interval data set); and FIGS. 6, 8 and 10 depict processing of the 150 cm data set (before combination with the 90 cm data set).

In this regard, FIG. 5 depicts an f-k plot 200, which contains a signal cone 204 that is centered about wave number zero. As shown in FIG. 5, vibration noise is aliased into the cone 204, such as at reference numeral 210. For the 150 cm interval data set, an f-k plot 208 (FIG. 6) reveals that vibration noise is also aliased into the cone 204 but at different frequencies than the frequencies at which the vibration noise is aliased into the signal cone 204 for the plot 200. Thus, as depicted in FIG. 6, the vibration noise is aliased into the cone 204 at reference numerals 212 and 214.

FIGS. 7 and 8 depict the two data sets after wave number filtering. In this regard, the wave number filtering removes seismic data associated with slower waves. Thus, an f-k plot 220 (FIG. 7) shows the result of the wave number filtering for the 90 cm interval data set, which results in noise outside of a wave number band 230 being removed. Similarly, an f-k plot 250 (FIG. 8) shows the result of the wave number filtering for the 150 cm interval data set, which results in signal content that outside of a wave number band 231 being removed.

Frequency band rejection filters are next applied to the two data sets to remove the content from frequency bands in which the vibration noise is aliased into the signal cone 204. For example, FIG. 9 depicts the application of a frequency band rejection filter to the 90 cm interval data set to remove the content from a frequency band 282, which corresponds to frequencies (such as at reference numeral 210 in FIGS. 5 and 7) in which the vibration noise is aliased into the signal cone 204. For the 150 cm interval data set, two frequency band rejection filters are applied to reject a frequency band 312, which corresponds to the vibration noise at reference numeral 212 (see FIGS. 6 and 8) and a frequency band 314, which corresponds to the frequencies at reference numeral 214 (see FIGS. 6 and 8).

As can be seen from a comparison of FIGS. 9 and 10, as a result of the frequency filtering, the two frequency filtered data sets may be combined to produce a data set, which corresponds to a full bandwidth signal, which is significantly free of vibration noise. Thus, with the combination, signal content from the non-frequency filtered bands 317 and 319 (see FIG. 9) of the 90 cm sampling interval data set are combined with signal content from the non-frequency filtered band 321 (see FIG. 10) of the 150 cm sampling interval data set to generate the full bandwidth composite data set that is substantially free of vibration noise.

The frequency bands may be selected by looking at the noise levels on the two filtered datasets. The frequency bands may alternatively be determined based on a calculation of the noise propagation.

Specific spatial sampling intervals of 90 cm and 150 cm are set forth herein for purposes of example. However, it is noted that other sampling intervals may be used in other embodiments of the invention. For example, in other embodiments of the invention, sensor spacing interval pairs of 1 m 1/24 (104 cm) and 1 m 9/16 (156 cm); 1 m 1/4 (125 cm) and 1 m 7/8 (187.5 cm); 140 cm and 250 cm; 113 cm and 210 cm; or 113 cm and 312.5 cm may be used, depending on the particular embodiment of the invention. Although there are two distinct spatial spacings, many of the sensors are common to the two data sets, as the two spacings are multiples of a common spacing. For example, in the spacing interval pair of 104 cm and 156 cm, each of these spacings is a multiple of a common 52 cm spacing; and in the spacing interval pair of 125 cm and 187.5 cm, each of these spacings is a multiple of a common 62.5 cm spacing. Other spacing interval pairs may be preferable for optimal noise and sensor number reduction. Thus, many variations are possible and are within the scope of the appended claims.

It is noted that the seismic sensors may take on numerous forms, depending on the particular embodiment of the invention. Thus, although the seismic sensors are described above as being geophones, the seismic sensors may be multicomponent sensors, moving coiled geophones, microelectromechanical sensors (MEMs), accelerometers, piezo accelerometers or any combination thereof. Thus, many variations are possible and are within the scope of the appended claims.

Referring to FIG. 11, in accordance with some embodiments of the invention, a seismic data processing system 600 may perform the technique 150 and variations thereof to generate a data set from which vibration noise has been filtered. In accordance with some embodiments of the invention, the system 600 may include a processor 602, such as one or more microprocessors or microcontrollers. The processor 602 may be coupled to a communication interface 630 for purposes of receiving the seismic data (such as the data sets that correspond to the different spatial sampling intervals). As examples, the communication interface 630 may be a USB serial bus interface, a network networked interface, a removable media (such as a flash card, CD-ROM, etc.) interface, or a magnetic storage interface (an IDE or SCSI interface, as just a few examples). Thus, the communication interface 630 may take on numerous forms, depending on the particular embodiment of the invention.

The communication interface 630 may be coupled to a memory 610 of the computer 600, which may, for example, store the various data sets involved with the technique as indicated at reference numeral 620, in accordance with some embodiments of the invention. Additionally, the memory 610 may store at least one application program 614, which is executed by the processor 602 for purposes of performing the technique 150. The memory 610 and communication interface 630 may be coupled together by at least one bus 640 and may be coupled by a series of interconnected buses and bridges, depending on the particular embodiment of the invention.

Other embodiments are within the scope of the appended claims. For example, in accordance with other embodiments of the invention, the techniques that are described herein may be applied to remove a noise other than a vibration noise. For example, in accordance with embodiments of the invention described herein, the disclosed techniques may be applied to remove any type of noise that slowly propagates along the streamer, such as non-acoustic noise (bulge waves and flow induced noise, as examples).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    obtaining different sets of data provided by seismic sensors located on a streamer shared in common, each of the sets of data being associated with a different spatial sampling interval; and
    processing the different sets of data on a machine to generate a signal indicative of a seismic event detected by the set of towed seismic sensors, the processing including using the different spatial sampling intervals to at least partially eliminate noise from the signal, wherein
    one of the data sets contains data associated with noise in a first frequency band;
    another one of the data sets contains data associated with noise in a second frequency band different from the first frequency band; and
    the processing the different sets of data to generate the signal comprises:
        filtering said one of the data sets to remove content associated with the first frequency band to produce a first filtered set of data:
        filtering said another one of the data sets to remove content associated with the second frequency band to produce a second filtered set of data; and
        combining the first and second filtered sets of data to generate a set of data indicative of the signal.

2. The method of claim 1, wherein the seismic sensors comprise geophone sensors.

3. The method of claim 1, further comprising:
    filtering the data sets to remove the noise.

4. The method of claim 1, wherein the noise comprises one of vibration noise, flow induced noise and bulge waves.

5. The method of claim 1, wherein one of the spatial sampling intervals is not an integer multiple of any of the other spatial sampling intervals.

6. A system comprising:
    an interface to receive different sets of data provided by seismic sensors located on a streamer shared in common, the data sets being associated with different spatial sampling intervals; and
    a processor to generate a signal indicative of a seismic event that is detected by the set of seismic sensors and use the different spatial sampling intervals to at least partially eliminate noise from the signal, the processor being adapted to:
        filter one of the data sets to remove content associated with a first frequency band to produce a first filtered set of data;
        filter another one of the data sets to remove content associated with a second frequency band different from the first frequency band to produce a second filtered set of data; and
        combine the first and second filtered sets of data to generate a set of data indicative of the signal.

7. The system of claim 6, wherein the noise comprises one of vibration noise, flow induced noise and bulge waves.

8. The system of claim 6, wherein the processor is adapted to filter the data sets to remove the noise.

9. The system of claim 6, wherein
    said one of the data sets contains data associated with noise in the first frequency band, and
    said another one of the data sets contains data associated with noise in the second frequency band different from the first frequency band.

10. The system of claim 6, wherein one of the spatial sampling intervals is not an integer multiple of any of the other spatial sampling intervals.

11. An article comprising a computer accessible storage medium to store instructions that when executed by a processor-based system cause the processor-based system to:
    obtain different sets of data provided by seismic sensors located on a streamer shared in common, each of the sets of data being associated with a different spatial sampling interval;
    process the different sets of data to generate a signal indicative of a seismic event detected by the set of towed seismic sensors;
    use the different spatial sampling intervals to at least partially eliminate noise from the Signal;
    filter one of the data sets to remove content associated with a first frequency band to produce a first filtered set of data;
    filter another one of the data sets to remove content associated with a second frequency band different from the first frequency band to produce a second filtered set of data; and
    combine the first and second filtered sets of data to generate a set of data indicative of the signal.

12. The article of claim 11, wherein the noise comprises one of vibration noise, flow induced noise and bulge waves.

13. The article of claim 11, the storage medium storing instructions that when executed by the processor-based system cause the processor-based system to:
    filter the data sets to remove the noise.

14. The article of claim 11, wherein
    said one of the data sets contains data associated with noise in the first frequency band, and
    said another one of the data sets contains data associated with noise in the second frequency band.

15. The article of claim 11, wherein one of the spatial sampling intervals is not an integer multiple of any of the other spatial sampling intervals.

16. A method comprising:
obtaining different sets of data provided by seismic sensors located on a streamer shared in common, each of the sets of data being associated with a different spatial sampling interval; and
on a machine to generate interval; and
processing the different sets of data on a machine, the processing comprising:
filtering one of the data sets according to first filtering criteria;
filtering another one of the data sets according to second filtering criteria different from the first filtering criteria; and
combining results of the filtering of the said one of the data sets and said another one of the data sets to generate a set of data indicative of a seismic event.

17. The method of claim 16, wherein the acts of filtering said one of the data sets and said another one of the data sets comprise removing noise from the signal.

18. The method of claim 17, wherein the noise comprises one of vibration noise, flow induced noise and bulge waves.

19. The method of claim 16, wherein one of the spatial sampling intervals is not an integer multiple of any of the other spatial sampling intervals.

20. A system comprising:
an interface to receive different sets of data provided by seismic sensors located on a streamer shared in common, the data sets being associated with different spatial sampling intervals; and
a processor to:
filter one of the data sets according to a first filtering criteria;
filter another one of the data sets according to a second filtering criteria different than the first filtering criteria; and
combine results of the filtering of said one of the data sets and said another one of the data sets to generate a set of data indicative of a seismic event.

21. The system of claim 20, wherein the noise comprises one of vibration noise, flow induced noise and bulge waves.

* * * * *

UNITED STATES PATENT AND TRADEMARK OFFICE
CERTIFICATE OF CORRECTION

| | | |
|---|---|---|
| PATENT NO. | : 7,835,223 B2 | Page 1 of 1 |
| APPLICATION NO. | : 11/740763 | |
| DATED | : November 16, 2010 | |
| INVENTOR(S) | : Nicolas Goujon | |

It is certified that error appears in the above-identified patent and that said Letters Patent is hereby corrected as shown below:

Column 9:
Line 6, delete "on a machine to generate interval; and".

Signed and Sealed this
Twenty-fourth Day of May, 2011

David J. Kappos
*Director of the United States Patent and Trademark Office*